United States Patent
Fang et al.

(10) Patent No.: US 10,949,158 B2
(45) Date of Patent: Mar. 16, 2021

(54) SCREENSHOT METHOD AND APPARATUS

(71) Applicant: TENCENT TECHNOLOGY (SHENZHEN) COMPANY LIMITED, Shenzhen (CN)

(72) Inventors: Liang Fang, Shenzhen (CN); Yanqing Jing, Shenzhen (CN); Dawei Sun, Shenzhen (CN); Xifeng Yang, Shenzhen (CN); Yan Huang, Shenzhen (CN); Jun Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 107 days.

(21) Appl. No.: 16/001,446

(22) Filed: Jun. 6, 2018

(65) Prior Publication Data
US 2018/0285053 A1    Oct. 4, 2018

Related U.S. Application Data

(63) Continuation of application No. PCT/CN2016/108686, filed on Dec. 6, 2016.

(30) Foreign Application Priority Data

Jan. 22, 2016   (CN) .......................... 201610042112.2

(51) Int. Cl.
*G06F 3/14* (2006.01)
*G06F 9/44* (2018.01)
(Continued)

(52) U.S. Cl.
CPC ............. *G06F 3/1454* (2013.01); *G06F 9/44* (2013.01); *G06F 9/452* (2018.02); *G06F 3/1415* (2013.01); *G06T 7/70* (2017.01)

(58) Field of Classification Search
CPC .. G06F 9/4443; G06F 17/241; G06F 3/04842; G06T 11/60; G06T 2200/24
See application file for complete search history.

(56) References Cited

U.S. PATENT DOCUMENTS

2002/0080171 A1    6/2002  Laferriere et al.
2013/0024851 A1*   1/2013  Firman ................ G06Q 20/123
                                                717/170
2013/0198336 A1*   8/2013  Kridlo ..................... H04L 67/06
                                                709/219

FOREIGN PATENT DOCUMENTS

CN    103000015 A    3/2013
CN    105094777 A    11/2015
(Continued)

OTHER PUBLICATIONS

The State Intellectual Property Office of the People's Republic of China (SIPO) Office Action 1 for 201610042112.2 dated Aug. 1, 2018 11 Pages (including translation).
(Continued)

*Primary Examiner* — Xiao M Wu
*Assistant Examiner* — Scott E Sonners
(74) *Attorney, Agent, or Firm* — Anova Law Group, PLLC

(57) ABSTRACT

A screenshot method includes receiving, by a local terminal, a remote screenshot instruction sent by a remote terminal, taking a screenshot by executing a screenshot logic corresponding to the remote screenshot instruction, and sending the screenshot to the remote terminal. The screenshot logic us configured in an operating system of the local terminal and corresponds to a version of the operating system.

18 Claims, 4 Drawing Sheets

(51) Int. Cl.
*G06F 9/451* (2018.01)
*G06T 7/70* (2017.01)

(56) References Cited

FOREIGN PATENT DOCUMENTS

| | | |
|---|---|---|
| CN | 105117337 A | 12/2015 |
| CN | 105988688 A | 10/2016 |

OTHER PUBLICATIONS

The State Intellectual Property Office of the People's Republic of China (SIPO) Office Action 2 for 201610042112.2 dated Mar. 1, 2019 11 Pages (including translation).
CSDN Blog, "Summary of screenshots on Android 5.0 and above", Dec. 3, 2015 (Dec. 3, 2015), pp. 1-8, Retrieved from the Internet: URL: https://blog.csdn.net/gulinxieying/article/details/50164469 19 Pages (including translation).
I Am Not a Salted Egg, "Talking about android screenshots problem", Aug. 30, 2012 (Aug. 30, 2012), pp. 1-4, Retrieved from the Internet: URL: https://my.oschina.net/JumpLong/blog/75556 20 Pages (including translation).
Softspider, "[reprint] Android screenshot analysis", Sina blog, Dec. 23, 2013 (Dec. 23, 2013), pp. 1-2, Retrieved from the Internet: URL: http://blog.sina.com.cn/s/blog_414e587f0101iurg.html 6 Pages (including translation).
The World Intellectual Property Organization (WIPO) International Search Report for PCT/CN2016/108686 dated Feb. 24, 2017 6 Pages (including translation).

* cited by examiner

SCREENSHOT METHOD AND APPARATUS

CROSS-REFERENCE TO RELATED APPLICATIONS

This application is a continuation application of PCT International Application No. PCT/CN2016/108686, filed on Dec. 6, 2016, which claims priority to Chinese Patent Application No. 201610042112.2, filed with the Chinese Patent Office on Jan. 22, 2016, and entitled "SCREENSHOT METHOD AND APPARATUS," both of which are incorporated herein by reference in their entirety.

FIELD OF THE TECHNOLOGY

This application relates to the field of screenshot technologies and, in particular, to a screenshot method and apparatus.

BACKGROUND OF THE DISCLOSURE

Screenshot function is widely used in software. The screenshot function may often be used when a user uses a mobile terminal. A current screen picture can be captured to be saved by means of the screenshot function, or the captured picture may be shared with others.

Currently, a main method used in a mobile terminal for taking a screenshot by receiving a remote terminal instruction is to implement screenshot by calling a screen cap instruction in a terminal. The screen cap instruction is a screenshot tool provided in Android system, and the screenshot speed is relatively low. For some scenarios, for example, a screen is displayed in real time to transfer a video or have a remote debugging, the screen cap instruction cannot satisfy the speed requirement.

SUMMARY

In accordance with the disclosure, there is provided a screenshot method. According to the method, a local terminal receives a remote screenshot instruction sent by a remote terminal, takes a screenshot by executing a screenshot logic corresponding to the remote screenshot instruction, and sends the screenshot to the remote terminal. The screenshot logic is configured in an operating system of the local terminal and corresponds to a version of the operating system.

Also in accordance with the disclosure, there is provided a terminal. The terminal includes a processor and a memory. The memory stores an operation instruction. The processor executes the operation instruction to receive a remote screenshot instruction sent by a remote terminal, take a screenshot by executing a screenshot logic corresponding to the remote screenshot instruction, and send the screenshot to the remote terminal. The screenshot logic is configured in an operating system of the terminal and corresponds to a version of the operating system.

Also in accordance with the disclosure, there is provided a non-transitory computer-readable storage medium. The storage medium stores a program for executing by a processor. The program causes the processor to receive a remote screenshot instruction sent by a remote terminal, take a screenshot of a local terminal by executing a screenshot logic corresponding to the remote screenshot instruction, and send the screenshot to the remote terminal. The screenshot logic is configured in an operating system of the local terminal and corresponds to a version of the operating system.

DESCRIPTION OF EMBODIMENTS

Embodiments of the present disclosure provide a screenshot method and apparatus, improving the screenshot processing speed and efficiency.

To allow persons skilled in the art to better understand the technical solutions in the present disclosure, technical solutions according to embodiments of the present disclosure will be described in detail with reference to the accompanying drawings. Apparently, the described embodiments are merely some rather than all of the embodiments of the present disclosure. All other embodiments obtained by persons of ordinary skill in the art based on the described embodiments of the present disclosure without creative efforts shall fall within the scope of the present disclosure.

In the specification, claims, and accompanying drawings of the present disclosure, the terms "first," "second," and so on (if exists) are intended to distinguish between similar objects rather than describe a specific order. It should be understood that the data termed in such a way are interchangeable in proper circumstances so that the embodiments of the present disclosure described herein can be implemented in other orders than the order illustrated or described herein. In addition, the terms "include," "contain," and any other variants mean to cover the non-exclusive inclusion, for example, a process, method, system, product, or apparatus that includes a list of steps or units is not necessarily limited to those steps or units, but may include other steps or units not expressly listed or inherent to such a process, method, system, product, or apparatus.

An example screenshot method consistent with embodiments of the disclosure is described below. The method can be implemented in a screenshot apparatus. The screenshot apparatus may be integrated in a client which may be loaded in a terminal. The terminal may be, for example, a smartphone, a tablet computer, or the like. The terminal configured to perform a screenshot method consistent with the disclosure is also referred to as a "local terminal."

In this application, a mobile phone having a screenshot function described in the following embodiments may be a cloud mobile phone having an Android system. Different screenshot flows may be set for different Android operating systems to implement a quick screenshot, so as to implement functions such as an online video or a remote testing with a remote terminal. An Android operating system can be an Android version above 4.2 (including Android 4.2 version) or an Android version below 4.2. In the embodiments of the present disclosure, an Android version above 4.2 is referred to as a first version, and an Android version below 4.2 is referred to as a second version.

Figure 1:
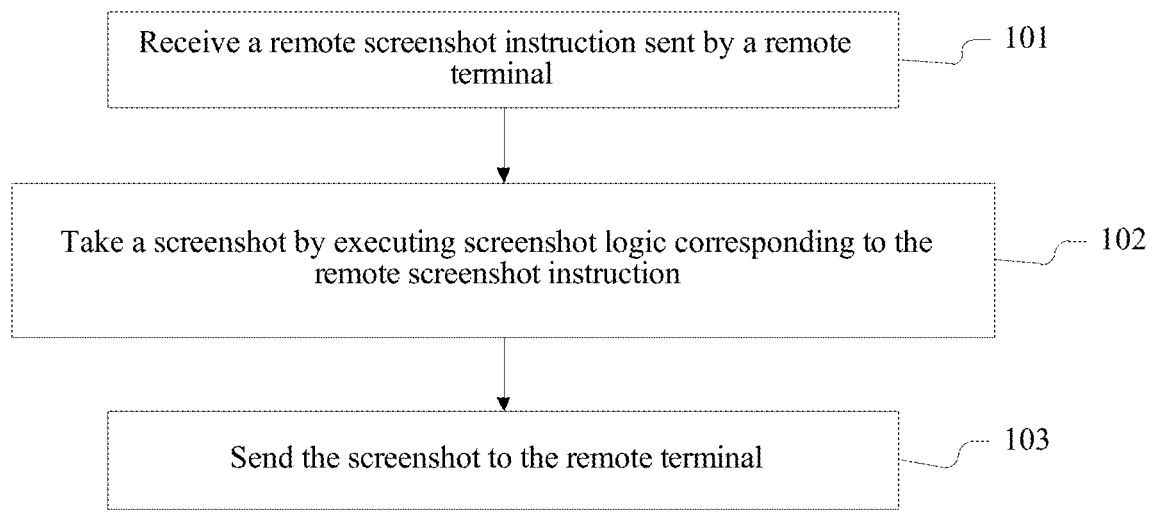
FIG. 1 is a schematic diagram of a screenshot method according to an embodiment of the present disclosure.

FIG. 1 shows a screenshot method consistent with the disclosure. As shown in FIG. 1, at 101, a remote screenshot instruction sent by a remote terminal is received. The remote screenshot instruction is an instruction instructing to continuously take screenshots during a period of time.

Figure 2:
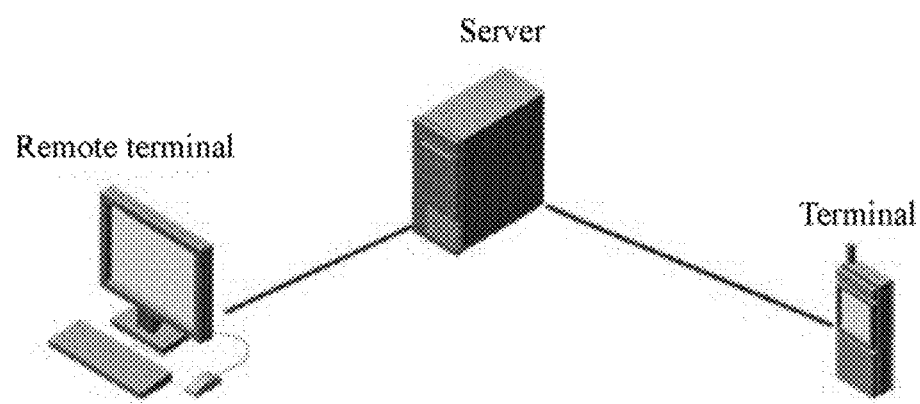
FIG. 2 is a schematic diagram of a scenario for implementing a screenshot method according to an embodiment of the present disclosure.

FIG. 2 shows an application scenario of online video consistent with the disclosure. In this scenario, the terminal exchanges data with the remote terminal by using a server (such as a cloud server). The screenshot apparatus in the terminal receives a remote screenshot instruction sent by the remote terminal by using the server. The remote screenshot instruction is an instruction instructing to continuously take screenshots during a period of time.

Figure 3:
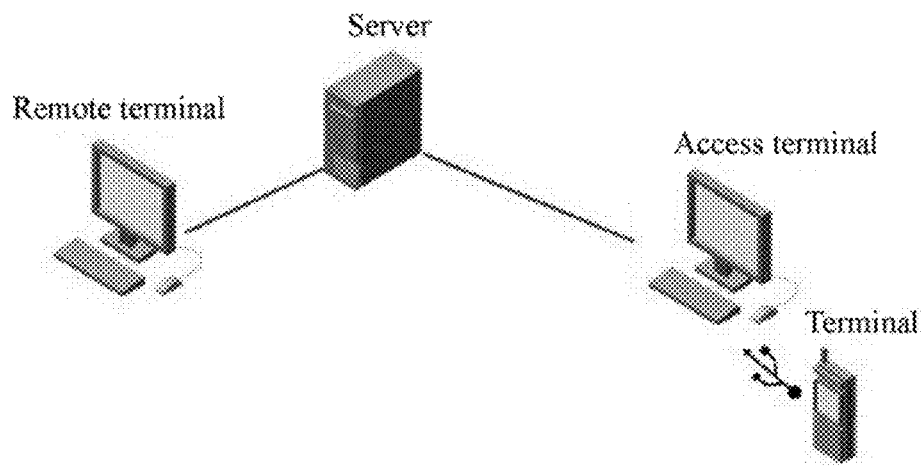
FIG. 3 is a schematic diagram of another scenario for implementing a screenshot method according to an embodiment of the present disclosure.

FIG. 3 shows another application scenario of remote testing consistent with the disclosure. In this scenario, the terminal is connected to an access terminal (for example, connected by using a USB interface). The access terminal may be a terminal such as a personal computer or a tablet having a universal interface (a USB3.1 interface such as a USB interface, a Micro USB interface, or a Type-C interface). The access terminal exchanges data with the remote terminal by using a server (such as a cloud server), thereby indirectly implementing data exchange between the terminal and the remote terminal. In this case, the remote screenshot instruction may be sent to the access terminal by the remote terminal by using the server, and subsequently be sent by the access terminal. For example, in the following specific scenario, a user connects to a Web interface of a remote terminal (such as a computer) of the server to perform remote operation on a terminal on the other side of the cloud (that is, a terminal including the screenshot apparatus consistent with the disclosure, such as a smartphone or a tablet computer that can install an APP application). The terminal is configured to allow the remote terminal to perform a remote software testing, for example, a mobile phone application (Application, APP) testing. The terminal may be connected to the access terminal (such as a personal computer) by using a USB, and a connection is established between the terminal and the server by using the access terminal. The remote terminal performs operation on the Web interface, and sends a remote screenshot instruction to the access terminal by using the server. The remote screenshot instruction is subsequently sent to the terminal by the access terminal.

In the scenario shown in FIG. 3, there is a more specific scenario, that is, a cloud prototype technology. Specifically, a debug bridge (Android Debug Bridge, ADB) client program is installed on the terminal, and an ADB server program is installed on the access terminal. The access terminal is connected to the terminal by using a USB interface, and the access terminal is connected to the remote terminal by using a cloud server. In this case, the access terminal receives, through the cloud server, a screenshot instruction sent by the remote terminal, subsequently sends an ADB shell instruction to the terminal, to instruct the terminal, through the ADB shell instruction, to take a screenshot by executing the screenshot logic and send the screenshot to the remote terminal. As such, in the cloud prototype scenario, the status of a software testing, such as an APP testing, on the terminal is displayed on the remote terminal in real time.

The ADB shell instruction enables an access terminal (such as a desktop computer) having the ADB server program installed thereon to directly operate and manage an android terminal (such as a mobile phone).

Generally, in the Android system, according to assigned permissions, user groups can mainly be classified as groups having root permission, groups having system permission, groups having shell permission, and the like. These groups have more permission than an ordinary APP. Permission of a shell group may be obtained by executing the screenshot logic (or program) by means of the ADB shell instruction. This permission may have functions such as obtaining a display screen, inputting, log, scard reading and writing, Bluetooth, and network. In this case, the screenshot logic (or program) may perform an operation such as obtaining a display screen, performing an operation that an ordinary APP has no permission to perform. A normal application may perform, by calling the screenshot logic, an operation that the normal APP usually cannot directly perform, such as obtaining a display screen.

Referring again to FIG. 2, at 102, a screenshot is taken by executing a screenshot logic corresponding to the remote screenshot instruction.

Figure 4:
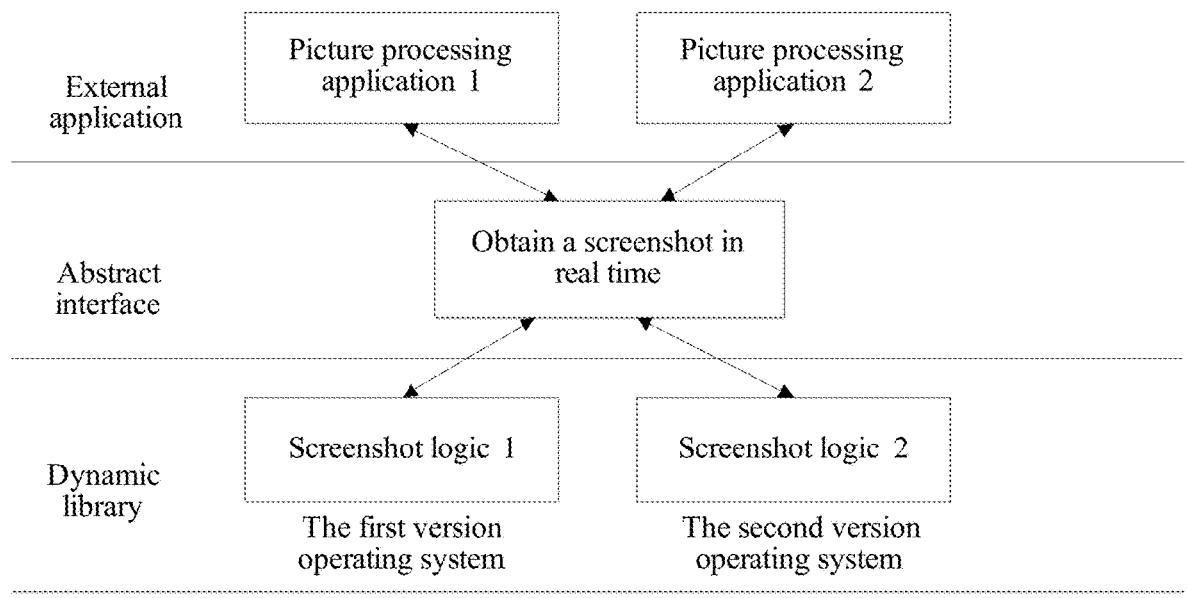
FIG. 4 is a schematic architectural diagram for implementing a screenshot method according to an embodiment of the present disclosure.

The screenshot can be a real-time screenshot. The screenshot logic can be a logic configured in an operating system of the terminal and correspond to a version of the operating system. As shown in FIG. 4, in the remote terminal of the scenario shown in FIG. 2, or in the access terminal of the scenario shown in FIG. 3, screenshot logic corresponding to multiple different terminal operating systems may be configured in a dynamic library. After determining the version of the operating system of the terminal, the screenshot logic corresponding to the version of the operating system of the terminal is sent to the terminal. That is, configuration of the screenshot logic in the terminal operating system is implemented. Different operating systems correspond to different screenshot logics, but all of the corresponding screenshot logics may implement a screenshot in real time. That is, the corresponding screenshot logics may be designed and defined as a unified abstract interface for all versions of the operating system and may be provided to different picture processing applications for processing.

Consistent with the present disclosure, in the scenario shown in FIG. 2, the screenshot logic may be sent by the terminal as corresponding to an operating system of the terminal after the remote terminal obtains the version of the operating system of the terminal and before taking a screenshot. That is, before a screenshot is taken, the remote terminal obtains the version of the operating system of the terminal and selects a screenshot logic corresponding to the version of the operating system from preset screenshot logics. The screenshot logic is sent to the terminal to be received by the terminal.

Consistent with the present disclosure, in the scenario shown in FIG. 3, the remote screenshot instruction is the ADB shell instruction that is sent to the terminal by the access terminal after the access terminal receives, through the cloud server, the screenshot instruction sent by the remote terminal. In this scenario, the screenshot logic may be sent, after the access terminal obtains the version of the operating system of the terminal, by the access terminal after the access terminal selects the screenshot logic corresponding to the version of the operating system from the preset screenshot logics. In some embodiments, the ADB shell instruction may be: adb shell+"screenshot logic name." After receiving the ADB shell instruction, the terminal may execute the screenshot logic on the terminal. In this case, the screenshot logic corresponding to the remote screenshot instruction is executed, so that the screenshot logic has shell permission to obtain a terminal display screen so as to take a real-time screenshot.

At 103, the screenshot is sent to the remote terminal.

In this embodiment, the remote screenshot instruction may include a communication address of at least one terminal other than the remote terminal. The screenshot may be sent to the at least one terminal at the same time when the screenshot is sent to the remote terminal, realizing synchronous display of the screen of the terminal on multiple terminals.

Consistent with the present disclosure, the remote screenshot instruction sent by the remote terminal is received, a real-time screenshot is taken by executing the screenshot logic corresponding to the remote screenshot instruction, and the real-time screenshot is sent to the remote terminal. Since the screenshot logic is preconfigured in the operating system of the terminal, and is a logic corresponding to the version of the operating system, the screenshot processing speed and efficiency are improved.

Optionally, when the version of the operating system is the first version, taking the screenshot by executing the screenshot logic corresponding to the remote screenshot instruction can include: creating a virtual screen configured to display a screen of the terminal and a screenshot buffer, taking a real-time screenshot of the screen of the terminal by using the virtual screen, and saving the real-time screenshot to the screenshot buffer.

Figure 5:
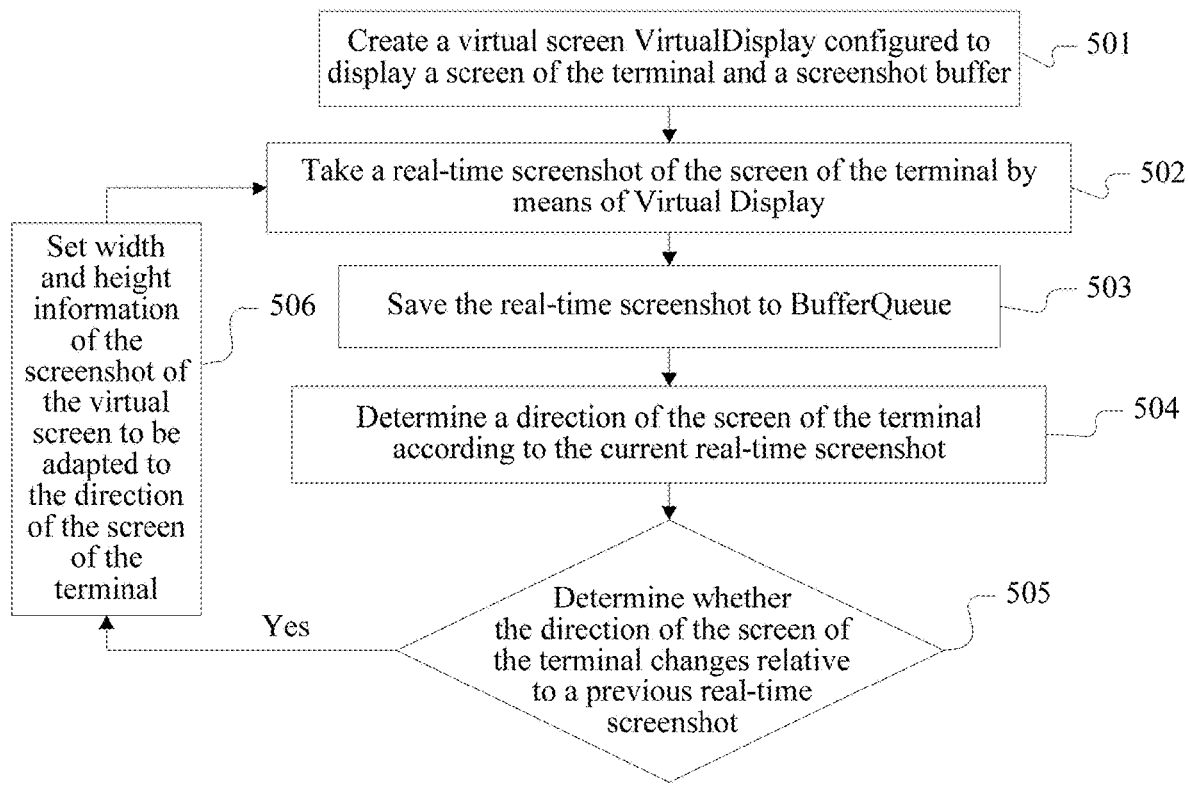
FIG. 5 is a schematic diagram of a specific scenario of taking a screenshot by executing a screenshot logic according to an embodiment of the present disclosure.

In some embodiments, the first version is a version of the operating system that is above Android 4.2. Using the scenario shown in FIG. 3 as an example implementation scenario, FIG. 5 shows an example of taking the screenshot by executing the screenshot logic corresponding to the remote screenshot instruction. As shown in FIG. 5, at 501, a virtual screen VirtualDisplay configured to display a screen of the terminal and a screenshot buffer are created.

SurfaceFlinger is a service of Android and is responsible for managing surfaces on an application end, e.g., for combining all surfaces. SurfaceFlinger is a layer between a graphic library and applications. After an application complete various graphic operations on the surface of the application, the application requests SurfaceFlinger to display the surface on the screen. SurfaceFlinger superimposes all the surfaces and reflects the surfaces to a frame buffer framebuffer (for example, BufferQueue described below).

An operating system of a version above Android 4.2 can support display of the virtual screen VirtualDisplay. Before creating the virtual screen VirtualDisplay configured to display the screen of the terminal, it is needed to first request a SurfaceFlinger service and establish a connection with SurfaceFlinger. Then the virtual screen VirtualDisplay can be displayed on the screen by requesting SurfaceFlinger. In this embodiment, a Surface-Composer-Client object may be constructed to request the SurfaceFlinger service and establish a connection with SurfaceFlinger.

When a screenshot buffer (BufferQueue) is created, a producer (BufferQueueProducer) and a consumer (BufferQueueConsumer) associated with BufferQueue may be bound. The producer of BufferQueue comes from the surface (managed by SurfaceFlinger) and the consumer is the virtual screen VirtualDisplay that was just created.

At 502, a real-time screenshot of the screen of the terminal is taken by means of VirtualDisplay.

At 503, the real-time screenshot is saved to BufferQueue.

Optionally, in some embodiments of the present disclosure, a listening object may be created to listen to the screenshot buffer. Therefore, the method may further include listening to the screenshot buffer.

In this case, sending the screenshot to the remote terminal can include sending the screenshot to the remote terminal when the screenshot exists in the screenshot buffer.

For example, a CPU-Consumer object may be created to listen to BufferQueue. When BufferQueue includes a new screenshot, the new screenshot is sent to the remote terminal.

Optionally, if a real-time screenshot is taken by means of the virtual screen VirtualDisplay, changes to a direction of the screen may need to be considered when a screenshot is taken. Therefore, the method may further include determining a direction of the screen of the terminal according to a current screenshot and, if the direction of the screen of the terminal changes relative to a previous real-time screenshot, width and height information of the screenshot of the virtual screen is set to be adapted to the direction of the screen of the terminal. That is, each time when a new screenshot picture is obtained, the current direction of the screen is determined whether to be in a landscape mode or a portrait mode according to the new picture. If the direction of the new screenshot picture changes relative to a previous direction, the width and height information of the screenshot of the virtual screen is reset to be adapted to the direction of the screen of the terminal. A screenshot is taken according to the new settings.

That is, in some embodiments, taking the screenshot can include further processes, as described below.

At 504, a direction of the screen of the terminal is determined according to the current screenshot.

At 505, whether the direction of the screen of the terminal changes relative to a previous real-time screenshot is determined. If yes, perform process 506.

At 506, width and height information of the screenshot of the virtual screen is set to be adapted to the direction of the screen of the terminal.

In this case, at process 502 described above, a screenshot is taken according to the new settings.

Optionally, when the version of the operating system is the second version, the second version operating system includes a screen shared memory and a screenshot proxy object configured to capture the screen of the terminal to the screen shared memory.

In these embodiments, taking the screenshot by executing the screenshot logic corresponding to the remote screenshot instruction may include obtaining a screenshot proxy object, obtaining a screenshot of the terminal by using the screenshot proxy object, and saving the screenshot to the screen shared memory.

Further, sending the screenshot to the remote terminal may include reading the screenshot from the screen shared memory and sending the screenshot to the remote terminal.

Figure 6:
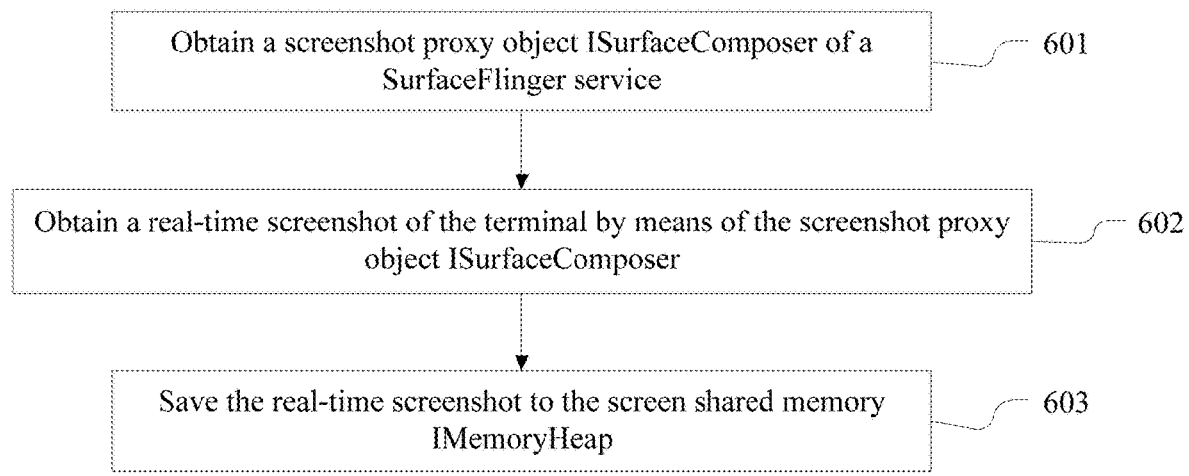
FIG. 6 is a schematic diagram of another specific scenario of taking a screenshot by executing a screenshot logic according to an embodiment of the present disclosure.

Consistent with the present disclosure, the second version is a version of the operating system below the operating system Android 4.2. Using the scenario shown in FIG. 3 as an example implementation scenario, FIG. 6 shows another example of taking the screenshot by executing the screenshot logic corresponding to the remote screenshot instruction. As shown in FIG. 6, at 601, a screenshot proxy object ISurfaceComposer of a SurfaceFlinger service is obtained.

In this embodiment, the screenshot proxy object ISurfaceComposer of the SurfaceFlinger service may be obtained by calling a function ComposerService::getComposerService( ).

In an operating system having a version below Android 4.2, when an application program process requests the SurfaceFlinger service, the proxy object of the SurfaceFlinger service first needs to be obtained. The proxy object is used to request SurfaceFlinger to create a Client object on a SurfaceFlinger server end for the application program process. The Client object receives and processes the request from the application program. In this embodiment, since the screenshot logic is executed, the screenshot proxy object needs to be obtained, such as ISurfaceComposer.

At 602, a screenshot of the terminal is obtained by means of the screenshot proxy object ISurfaceComposer.

At 603, the screenshot is saved to the screen shared memory IMemoryHeap.

IMemoryHeap is an anonymous shared memory created during an originating process of SurfaceFlinger, configured to save system display screen information and share the information with all processes in the system to visit.

The screenshot in IMemoryHeap may further be saved to another memory space, and this is not limited herein. In this case, the screenshot may be obtained from the IMemoryHeap or another memory space additionally storing the screenshot to be sent to the remote terminal.

The following describes a screenshot apparatus consistent with embodiments of the present disclosure. The screenshot apparatus can be implemented in the terminal.

Figure 7:
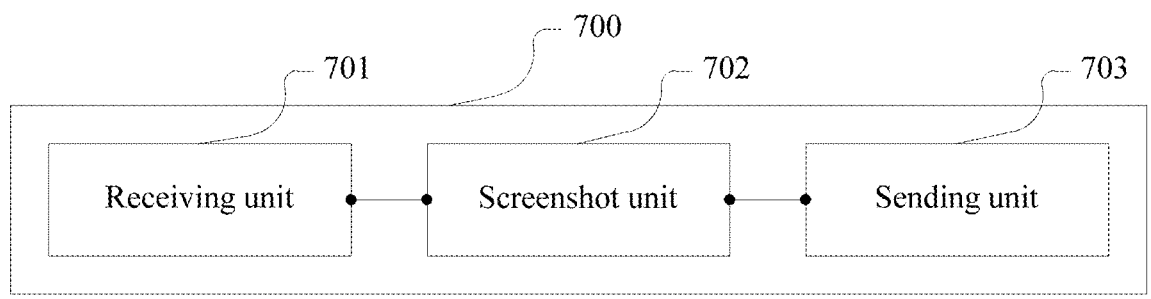
FIG. 7 is a schematic diagram of a screenshot apparatus according to an embodiment of the present disclosure.

FIG. 7 shows a screenshot apparatus 700 according to embodiments of the present disclosure. As shown in FIG. 7, the screenshot apparatus 700 includes a receiving unit 701, a screenshot unit 702, and a sending unit 703.

The receiving unit 701 is configured to receive a remote screenshot instruction sent by a remote terminal. The remote screenshot instruction is an instruction instructing to continuously take screenshots during a period of time.

The screenshot unit 702 is configured to take a screenshot by executing a screenshot logic corresponding to the remote screenshot instruction. The screenshot logic is a logic configured in an operating system of the terminal and corresponding to a version of the operating system.

The sending unit 703 is configured to send the screenshot to the remote terminal.

In this embodiment of the present disclosure, the screenshot unit 702 takes a screenshot by executing the screenshot logic corresponding to the remote screenshot instruction, and the sending unit 703 sends the screenshot to the remote terminal. Since the screenshot logic is preconfigured in the operating system of the terminal, and is a logic corresponding to the version of the operating system, the screenshot processing speed and efficiency are improved.

Optionally, when the version of the operating system is the first version, the screenshot unit 702 is further configured to create a virtual screen configured to display a screen of the terminal and a screenshot buffer, take a screenshot of the screen of the terminal through the virtual screen, and save the screenshot to the screenshot buffer.

Optionally, the apparatus further includes a listening unit, configured to listen to the screenshot buffer. The sending unit 703 is further configured to send the screenshot to the remote terminal when the screenshot exists in the screenshot buffer.

Optionally, the apparatus further includes an adjusting unit, configured to determine a direction of the screen of the terminal according to a current screenshot, and set width and height information of the screenshot of the virtual screen to be adapted to the direction of the screen of the terminal when the direction of the screen of the terminal changes relative to a previous screenshot.

Optionally, when the version of the operating system is the second version, the second version operating system includes a screen shared memory and a screenshot proxy object configured to capture the screen of the terminal to the screen shared memory. The screenshot unit 702 is further configured to obtain the screenshot proxy object, obtain a screenshot of the terminal by using the screenshot proxy object, and save the screenshot to the screen shared memory. The sending unit 703 is further configured to read the screenshot from the screen shared memory and send the screenshot to the remote terminal.

Figure 8:
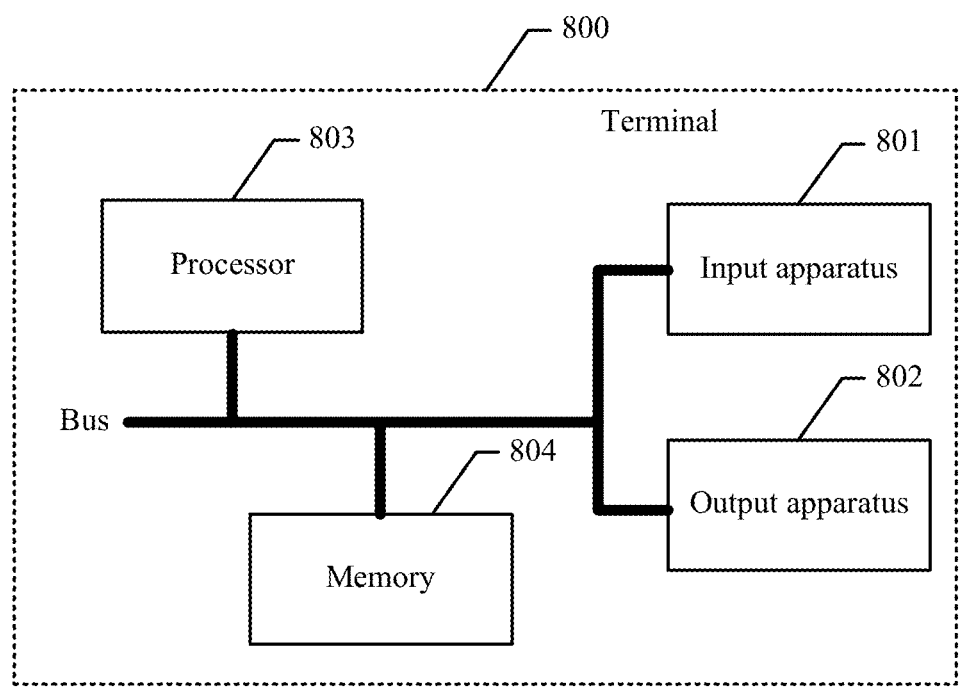
FIG. 8 is a schematic diagram of a terminal having a screenshot apparatus according to an embodiment of the present disclosure.

The foregoing describes the screenshot apparatus in the embodiments of the present disclosure from an aspect of unit functional entity, and the following describes the terminal of the screenshot apparatus in the embodiments of the present disclosure from an aspect of hardware processing. FIG. 8 is a structural diagram of a terminal 800 consistent with embodiments of the present disclosure. As shown in FIG. 8, the terminal 800 includes an input apparatus 801, an output apparatus 802, a processor 803, and a memory 804. The terminal 800 may include one or more processors, and FIG. 8 shows one processor 803 as an example. In some embodiments of the present disclosure, the input apparatus 801, the output apparatus 802, the processor 803, and the memory 804 may be connected by using a bus or in another manner. FIG. 8 shows a connection by using the bus as an example.

The terminal involved in this embodiment of the present disclosure may include more components or fewer components than those shown in FIG. 8, or two or more components may be combined, or a different component deployment or setting may be used. The components may be implemented in hardware, software, or a combination of hardware and software that includes one or more signal processing and/or application-specific integrated circuits.

By calling an operation instruction stored in the memory 804, the processor 803 can perform a method consistent with the disclosure, such as one of the example methods described above. In some embodiments, the processor 803 can receive a remote screenshot instruction sent by a remote terminal through the input apparatus 801. The remote screenshot instruction is an instruction instructing to continuously take screenshots during a period of time. The processor 803 can take a screenshot by executing a screenshot logic corresponding to the remote screenshot instruction. The screenshot logic is a logic configured in an operating system of the terminal and corresponding to a version of the operating system. The processor 803 can further send the screenshot to the remote terminal through the output apparatus 802.

Optionally, when the version of the operating system is the first version, by calling the operation instruction stored in the memory 804, the processor 803 can further create a virtual screen configured to display a screen of the terminal and a screenshot buffer, take a screenshot of the screen of the terminal through the virtual screen, and save the screenshot to the screenshot buffer.

Optionally, by calling the operation instruction stored in the memory 804, the processor 803 can further listen to the screenshot buffer.

In this case, by calling the operation instruction stored in the memory 804, the processor 803 can send the screenshot to the remote terminal when the screenshot exists in the screenshot buffer.

Optionally, by calling the operation instruction stored in the memory 804, the processor 803 can determine a direction of the screen of the terminal according to a screenshot of a current real screen, and set width and height information of the screenshot of the virtual screen to be adapted to the direction of the screen of the terminal when the direction of the screen of the terminal changes relative to a previous screenshot.

Optionally, when the version of the operating system is the second version, the second version operating system includes a screen shared memory and a screenshot proxy object configured to capture the screen of the terminal to the screen shared memory. By calling the operation instruction stored in the memory 804, the processor 803 can obtain the screenshot proxy object, obtain a screenshot of the terminal by using the screenshot proxy object, and save the screenshot to the screen shared memory.

In this case, by calling the operation instruction stored in the memory 804, the processor 803 can read the screenshot from the screen shared memory and send the screenshot to the remote terminal.

Embodiments of the present disclosure further provide a computer storage medium, where the computer storage medium may store a program, and when the program is executed, at least a part of or an entire screenshot method consistent with the disclosure, such as one of the example method described above, can be performed. The computer storage medium can be, for example, a non-transitory computer-readable storage medium, such as a USB flash drive, a removable hard disk, a read-only memory (ROM, Read-Only Memory), a random access memory (RAM, Random Access Memory), a magnetic disk, or an optical disc.

Persons skilled in the art can clearly learn that, for convenient and concise description, in the foregoing embodiments, the description of each embodiment has respective focuses. For a part that is not described in detail in an embodiment, reference may be made to related descriptions in other embodiments.

It should be noted that, for simple description, the foregoing method embodiments are represented as a series of actions, but persons skilled in the art should appreciate that the present disclosure is not limited to the described order of the actions because some steps may be performed in another order or performed simultaneously according to the present disclosure. In addition, persons skilled in the art should also know that the embodiments described in this specification all belong to preferred embodiments, and the involved actions and modules are not mandatory to the present disclosure.

In the embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the existing technology, or all or some of the technical solutions may be implemented in the form of a software product. The software product is stored in a storage medium and includes several instructions for instructing a computer apparatus (which may be a personal computer, a server, or a network apparatus) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A screenshot method comprising:
   receiving, by a local terminal, a remote screenshot instruction sent by a remote terminal, wherein the remote screenshot instruction includes a communication address of at least one terminal other than the remote terminal;
   receiving, by the remote terminal, information on a version of an operating system of the local terminal;
   selecting, by the remote terminal, a screenshot logic from a library of screenshot logics according to the information on the version of the operating system of the local terminal, wherein the library of screenshot logics correlates screenshot logics with different versions of operating systems;
   taking a screenshot, by the local terminal, via executing the screenshot logic corresponding to the remote screenshot instruction, the screenshot logic being configured in the operating system of the local terminal and corresponding to the version of the operating system, including:
      obtaining a screenshot proxy object;
      obtaining the screenshot by using the screenshot proxy object;
      saving the screenshot to a screen shared memory; and reading the screenshot from the screen shared memory; and sending the screenshot to the remote terminal; and sending the screenshot, by the local terminal, to the remote terminal and the at least one terminal other than the remote terminal.

2. The method according to claim 1, wherein the screenshot is a screenshot of a screen of the local terminal, and wherein taking the screenshot via executing the screenshot logic corresponding to the remote screenshot instruction comprises:

creating a virtual screen configured to display the screen of the local terminal and a screenshot buffer;

taking the screenshot of the screen through the virtual screen; and saving the screenshot to the screenshot buffer.

3. The method according to claim 2, further comprising:

listening to the screenshot buffer, wherein sending the screenshot to the remote terminal comprises: sending the screenshot to the remote terminal when the screenshot exists in the screenshot buffer.

4. The method according to claim 2, further comprising:

determining a direction of the screen according to a current screenshot; and setting width and height information of the screenshot to be adapted to the direction of the screen when the direction of the screen changes relative to a previous screenshot.

5. The method according to claim 1, wherein receiving the remote screenshot instruction sent by the remote terminal comprises:

receiving the remote screenshot instruction sent by the remote terminal through a server.

6. The method according to claim 1, wherein receiving the remote screenshot instruction sent by the remote terminal comprises:

receiving the remote screenshot instruction sent by the remote terminal through a server and an access terminal; and receiving, before taking the screenshot, the screenshot logic sent by the access terminal according to the version of the operating system.

7. The method according to claim 1, wherein the screenshot is sent, at the same time, to the remote terminal and the at least one terminal other than the remote terminal, to realize synchronous display of the screenshot.

8. The method according to claim 1, wherein the remote screenshot instruction instructs to continuously take screenshots during a period of time.

9. A terminal comprising: a processor; and a memory storing an operation instruction that, when executed by the processor, causes the processor to:

receive a remote screenshot instruction sent by a remote terminal, wherein the remote screenshot instruction includes a communication address of at least one terminal other than the remote terminal;

send to the remote terminal information on a version of an operation system of the terminal;

receive a screenshot logic from the remote terminal in response to the version of the operation system, the remote terminal including a library of screenshot logics correlating screenshot logics with different versions of operating systems;

take a screenshot by executing the screenshot logic corresponding to the remote screenshot instruction, the screenshot logic being configured in the operating system of the terminal and corresponding to the version of the operating system, including:

obtaining a screenshot proxy object;

obtaining the screenshot by using the screenshot proxy object;

saving the screenshot to a screen shared memory; and reading the screenshot from the screen shared memory; and sending the screenshot to the remote terminal; and send the screenshot to the remote terminal and the at least one terminal other than the remote terminal.

10. The terminal according to claim 9, wherein the screenshot is a screenshot of a screen of the terminal, and wherein the operation instruction further causes the processor to:

create a virtual screen configured to display the screen of the terminal and a screenshot buffer;

take the screenshot of the screen through the virtual screen; and save the screenshot to the screenshot buffer.

11. The terminal according to claim 10, wherein the operation instruction further causes the processor to:

listen to the screenshot buffer; and send the screenshot to the remote terminal when the screenshot exists in the screenshot buffer.

12. The terminal according to claim 10, wherein the operation instruction further causes the processor to:

determine a direction of the screen according to a current screenshot; and set width and height information of the screenshot to be adapted to the direction of the screen when the direction of the screen changes relative to a previous screenshot.

13. The terminal according to claim 9, wherein the operation instruction further causes the processor to:

receive the remote screenshot instruction sent by the remote terminal through a server.

14. The terminal according to claim 9, wherein the operation instruction further causes the processor to:

receive the remote screenshot instruction sent by the remote terminal through a server and an access terminal; and receive, before taking the screenshot, the screenshot logic sent by the access terminal according to the version of the operating system.

15. A non-transitory computer-readable storage medium storing a program that, when executed by a processor, causes the processor to:

receive a remote screenshot instruction sent by a remote terminal, wherein the remote screenshot instruction includes a communication address of at least one terminal other than the remote terminal;

send to the remote terminal information on a version of an operating system of a local terminal;

select, by the remote terminal, a screenshot logic from a library of screenshot logics according to the information on the version of the operating system of the local terminal, wherein the library of screenshot logics correlates screenshot logics with different versions of operating systems;

take a screenshot, by the local terminal, via executing the screenshot logic corresponding to the remote screenshot instruction, the screenshot logic being configured in the operating system of the local terminal and corresponding to the version of the operating system, including:

obtaining a screenshot proxy object;

obtaining the screenshot by using the screenshot proxy object;
saving the screenshot to a screen shared memory; and
reading the screenshot from the screen shared memory; and
sending the screenshot to the remote terminal; and
send the screenshot, by the local terminal, to the remote terminal and the at least one terminal other than the remote terminal.

16. The storage medium according to claim 15, wherein the screenshot is a screenshot of a screen of the local terminal, and wherein the program further causes the processor to:
create a virtual screen configured to display the screen of the local terminal and a screenshot buffer;
take the screenshot of the screen through the virtual screen; and
save the screenshot to the screenshot buffer.

17. The storage medium according to claim 16, wherein the program further causes the processor to:
listen to the screenshot buffer; and
send the screenshot to the remote terminal when the screenshot exists in the screenshot buffer.

18. The storage medium according to claim 16, wherein the program further causes the processor to:
determine a direction of the screen according to a current screenshot; and
set width and height information of the screenshot to be adapted to the direction of the screen when the direction of the screen changes relative to a previous screenshot.

* * * * *